No. 896,302. PATENTED AUG. 18, 1908.
I. KITSEE.
PHONOGRAPHY.
APPLICATION FILED NOV. 1, 1907.

WITNESSES: INVENTOR.

UNITED STATES PATENT OFFICE.

ISIDOR KITSEE, OF PHILADELPHIA, PENNSYLVANIA.

PHONOGRAPHY.

No. 896,302.  Specification of Letters Patent.  Patented Aug. 18, 1908.

Application filed November 1, 1907. Serial No. 400,175.

*To all whom it may concern:*

Be it known that I, ISIDOR KITSEE, citizen of the United States, residing at Philadelphia, in the county of Philadelphia and State of Pennsylvania, have invented certain new and useful Improvements in Phonography, of which the following is a specification.

My invention relates to an improvement in phonography. Its object is to produce a phonographic record with the aid of which sounds may be reproduced.

Figure 1:
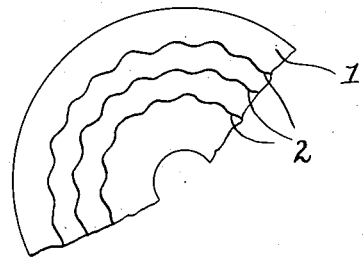
Figure 2:
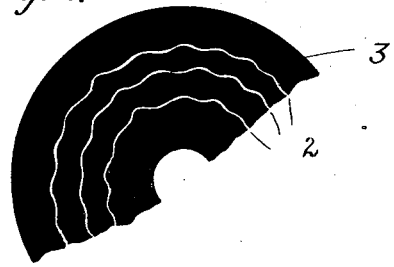
Figure 3:
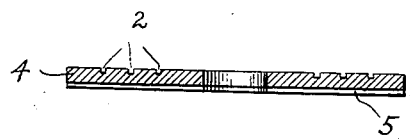

In the drawing, Figures 1 and 2 are plan views of records at different stages and Fig. 3 is a sectional view of the finished record.

To produce the final record in accordance with this, my invention, it is first necessary to produce the recording lines, due to the sound waves, in a manner so as to be able to photograph the same; and in the drawing, Fig. 1 illustrates this step of my invention; and in this figure, 1 is the material on which the lines of record are marked and 2 are the lines of record. I prefer that the material 1 should be transparent and the lines 2 opaque to the rays of light. I have found that tracing cloth is well adapted for the purpose and a very expedient way of producing the lines of record is, by simply drawing, with the aid of a colored fluid, the lines on said cloth; the means to draw said lines being operatively related to the phonographic diaphragm. I use this plate or record as a positive to produce photographically a negative therefrom.

The process of producing a photographic negative is well understood and does not need to be enlarged upon here. It suffices to say that those places which are in the positive opaque to the rays of light will be produced in the negative in a manner so as to be transparent to the rays of light and vice versa; the places transparent to the rays of light on the positive will be opaque to the rays of light on the negative, provided that the negative is made and washed in accordance with the usual process, and Fig. 2 represents such a negative; in this figure, 3 designates the parts opaque to the rays of light and 2 the lines of record now transparent to the rays of light.

To produce a record plate, with the aid of which sounds may be reproduced, I have recourse to the following arrangement:—I cover a suitable base, such for instance as a metallic plate, with a comparatively thick layer of gelatin, in which a chrome, such for instance as a bi-chromate of potassium, is dissolved. This plate is carefully screened from the rays of light. After the plate has dried, that is, ripened—as I call it—, it is subjected to the rays of light with the interposition of the negative. The rays of light will, therefore, only strike those parts of the gelatin coating which are not protected by the opaque material of the negative. In other words, only such parts of the gelatin coating will be exposed to the light as correspond to the transparent lines of record on the negative; all other parts of the gelatin coating being screened from the rays of light by the opaque parts of said negative. After the necessary exposure, the gelatin plate is removed from the source of light. When a gelatin, intermixed with a bi-chromate of potassium, is exposed to the rays of light, those parts on which the rays of light fall will become hard and dry, whereas, such parts which are screened from the rays of light will remain in their pliable state. When now a gelatin so prepared is moistened with luke warm water, those parts, formerly exposed to the rays, will remain unaltered, but the parts screened from the rays will take up part of the water and will thereby swell up. The plate so manipulated will present a surface comprising raised and depressed parts. The raised parts are due to the swelling up of the gelatin formerly screened from the light and the depressed parts represent the gelatin not raised through the action of the water. It has been necessary to thus make clear the action of light on gelatin having intermixed therein a bi-chromate of potassium, so that the production of the final record should be well understood by persons versed in the art.

As stated above, the plate of gelatin is, after due exposure to the light, removed from this source. To produce the necessary change in this gelatin plate, so as to be able to use the lines of record for the reproduction of sound, it is necessary to depress these lines, or what is the same—to raise the parts intervening, and for this purpose, I subject the plate to the action of moisture. Fig. 3 represents such final record and in this record, 5 is the support plate; 4 the prepared gelatin and 2 are the lines of record, here shown in intaglio.

Having now described my invention, what I claim as new and desire to secure by Letters Patent is:—

1. The method of producing phonographic records, which consists in obtaining a positive of the sound waves, then producing a negative therefrom with portions thereof transparent to rays of light, then exposing a sensitized gelatinous surface through the transparent portions of said negative to the action of the light rays, and finally raising the portions of the sensitized surface not exposed by the negative, whereby the exposed portions are depressed relatively to the unexposed portions.

2. The method of producing phonographic records, which consists in recording the sound waves in a manner to render them susceptible of photographic reproduction, then producing photographically a negative therefrom, then exposing a sensitized gelatinous surface through the transparent portions of said negative to the action of light rays, and finally raising the portions of the sensitized surface not exposed by the negative, whereby the exposed portions are depressed relatively to the unexposed portions.

3. The method of producing phonographic records, which consists in recording the sound waves in opaque lines upon a transparent body to obtain a positive of said sound waves, then producing photographically a negative thereof, then exposing a sensitized gelatinous surface through the transparent portions of said negative to the action of light rays, and finally raising the portions of the sensitized surface not exposed by the negative, whereby the exposed portions are depressed relatively to the unexposed portions.

4. The method of producing phonographic records, which consists in obtaining a positive of the sound waves, then producing a negative therefrom with portions thereof transparent to rays of light, then exposing a chromated gelatinous surface through the transparent portions of said negative to the action of the light rays, and finally subjecting to the action of moisture the portions of the surface not exposed by the negative, whereby said portions are raised relatively to the exposed portions.

5. The method of producing phonographic records, which consists in recording the sound waves in a manner to render them susceptible of photographic reproduction, then producing photographically a negative therefrom, then exposing a chromated gelatinous surface through the transparent portions of said negative to the action of light rays, and finally subjecting to the action of moisture the portions of the surface not exposed by the negative, whereby said portions are raised relatively to the exposed portions.

6. The method of producing phonographic records, which consists in recording the sound waves in opaque lines upon a transparent body to obtain a positive of said sound waves, then producing photographically a negative thereof, then exposing a chromated gelatinous surface through the transparent portions of said negative to the action of light rays, and finally subjecting to the action of moisture the portions of the surface not exposed by the negative, whereby said portions are raised relatively to the exposed portions.

In testimony whereof I affix my signature in presence of two witnesses.

ISIDOR KITSEE.

Witnesses:
  EDITH R. STILLEY,
  MARY C. SMITH.